United States Patent [19]

Feil

[11] 4,351,987
[45] Sep. 28, 1982

[54] TELEPHONE LINE CIRCUIT HOLD ARRANGEMENT

[75] Inventor: Thomas E. Feil, New York, N.Y.

[73] Assignee: V-Band Systems, Inc., New York, N.Y.

[21] Appl. No.: 249,372

[22] Filed: Mar. 31, 1981

[51] Int. Cl.³ .............................................. H04Q 5/18
[52] U.S. Cl. ........................... 179/99 H; 179/99 LC; 179/81 R
[58] Field of Search ............. 179/99 H, 99 LC, 81 R, 179/18 F, 18 FA, 16 A, 16 AA

[56] References Cited

U.S. PATENT DOCUMENTS

| | | | |
|---|---|---|---|
| 3,647,983 | 3/1972 | Fitzsimons et al. | 179/99 |
| 3,742,151 | 6/1973 | Ruether | 179/99 H |
| 3,840,710 | 10/1974 | Limiero et al. | 179/99 H |
| 3,870,831 | 3/1975 | McCaley | 179/99 |
| 3,895,192 | 7/1975 | Angner et al. | 179/99 |
| 3,925,625 | 12/1975 | Angner et al. | 179/99 H |
| 4,001,520 | 1/1977 | Waldman | 179/81 R |
| 4,011,413 | 3/1977 | Phillips | 179/81 R |
| 4,063,045 | 12/1977 | Greischar | 179/18 FA |
| 4,101,741 | 7/1978 | Kunstatter | 179/99 LC |
| 4,311,880 | 1/1982 | Balzer et al. | 179/99 H |

Primary Examiner—Gerald L. Brigance

[57] ABSTRACT

There is disclosed an improved hold circuit arrangement for controlling the hold function in a key telephone line circuit without introducing an undesired series impedance in the longitudinal path of the telephone line during any of the line circuit's normal operating states. The improved circuit arrangement employs a combination of an opto-coupled energizing circuit for detecting and responding to the presence of d.c. current on the telephone line during the hold state and two miniature relays which operate to establish a condition of electrical isolation between the opto-coupled energizing circuit and the longitudinal path of the telephone line in all operating states except during the momentary transition from the line busy to the line hold state. In another embodiment of this invention, logic circuitry is associated with the opto-coupled energizing circuit to provide lamp control indicative of the line state. The invention reduces the overall cost and profile of the line circuit while providing a means for eliminating a common cause of longitudinal imbalance during the hold state characteristic of conventional line circuit technology.

8 Claims, 2 Drawing Figures

| R1 | 150 Ω |
| R2 | 1.5 KΩ |
| R3 | 100 Ω |
| R4 | 10 KΩ |
| R5 | 22 KΩ |
| R6 | 22 KΩ |
| R7 | 10 KΩ |
| R8 | 2.2 KΩ |
| R9 | 2.2 KΩ |
| C1 | .22 mfd |

TELEPHONE LINE CIRCUIT HOLD ARRANGEMENT

FIELD OF THE INVENTION

This invention generally relates to an improved line circuit hold control arrangement for use with conventional 1A2-type key telephone systems, or with other systems where it is desired to maintain a longitudinally balanced condition on the telephone line during one or other operating state. More particularly this invention relates to a circuit arrangement which permits the telephone line to be placed in the line hold state without disturbing the balanced condition of the line in the longitudinal path. The maintainance of a balanced condition has become essential as a result of the recent promulgation by U.S. and Canadian regulatory authorities of technical telephone standards applicable to customer premise devices which connect to the public telephone network.

BACKGROUND OF THE INVENTION

Traditional telephone arrangements whereby a number of lines may be accessed from a single station instrument are called key telephone systems. They are located on the customer's premise and are generally connected either to telephone lines originating from central office switching equipment or from a local PBX. In either instance the telephone line consists of a pair of conductors, a tip conductor and a ring conductor. In such systems line circuits such as the line circuits shown in U.S. Pat. No. 3,436,488, issued to R. E. Barbato and D. T. Davis on Apr. 1, 1969, U.S. Pat. No. 3,647,983, issued to A. R. Fitzsimons and R. J. Phelps on Mar. 7, 1972, and U.S. Pat. No. 3,895,192, issued to R. J. Angner and A. Feiner on July 15, 1975, are connected between the station and the telephone line for the purpose of controlling the line to station connection. Such line circuits typically are comprised of logic circuitry and either three or four operating relays, and further include circuitry for delivering power, for ring detection, and for providing a visual indication of line status. One line circuit is ordinarily required for each telephone line serving the system, while each line circuit may serve one or more telephone station sets. Thus, particularly as the number of telephone lines serving a customer's premise increases, the cost as well as the physical size of the line circuit becomes an important factor in determining the cost and compactness of the overall key system installation. Designers and inventors, including those referenced in connection with the patents cited above, over the years have attempted to improve the reliability and reduce the size and the cost of line circuits by employing solid state electronics and minimizing the number of large, costly and failure prone mechanical components required for line circuit operation. This is reflected, for example, in the Fitzsimons and Angner patents which reduced the number of relays employed in conventional line card technology from four (see the Barbato patent) to three.

Notwithstanding the achievements in conventional key system technology over the years, recent regulatory changes and marketplace developments have imposed new demands on key system technology heretofore not considered critically important in the design of prior art line circuits. The Federal Communication Commission has determined that the direct connection of terminal equipment should not introduce any harmful or potentially degrading effects onto the public telephone network facilities represented, for example, by the basic telephone line from the central office to the customer's premise. Among the parameters required by the Federal Communication Commission (F.C.C.) to be met and maintained by directly connected telephone equipment, including key telephone systems, are minimum limits on longitudinal balance. According to Section 68.310 of the F.C.C.'s Rules and Regulations (47 CFR §68.310) prescribed minimum balanced conditions, measured by the coefficient of metalic-to-longitudinal balance must be satisfied in all normal operating states of the equipment. In key systems the line circuit is one of the most significant system components effecting the balance parameter, and conventional line circuit designs have been shown recently to have difficulty meeting the F.C.C.'s prescribed minimum standards.

The metallic-to-longitudinal balance coefficient relates longitudinal balance at the terminal equipment to induced energy in other loops or lines, and therefore has been determined to be the appropriate measure of potential for harmful cross talk or noise interference with telephone service. The longitudinal balance limitations recently made applicable to terminal equipment are predicated upon the parallel connection of the equipment to complete a "loop" comprised of the tip and ring conductors of the telephone line bridged by the equipment at the termination of the line. Where a series impedance (e.g., a relay coil) is interposed on one conductor path of the telephone line (either tip or ring), that impedance upsets the otherwise longitudinally balanced state of the equipment (e.g., a station set) with which it is in series, as perceived by the telephone network. Balance is, further, a function of both series (i.e., resistive) unbalance and shunt (capacitive) unbalance to ground. More specifically, series unbalance may be defined as the series impedance difference between tip and ring, and can be a significant cause of longitudinal imbalance in circuits characterized by low longitudinal impedance. Shunt capacitive unbalance is the most general cause of line-to-terminal equipment imbalance and is defined as the difference between tip-to-ground capacitance and ring-to-ground capacitance. In key telephone systems the line circuit is a potential source for both kinds of imbalance.

DESCRIPTION OF THE PRIOR ART

The design of prior art line circuits typified by those described in the Barbato or Fitzsimons patents generally introduce both types of imbalance, while other designs such as that typified by the Angner patent, fall short of achieving the desired, completely balanced result in an efficient and effective manner.

The conventional line circuit is operated to place a line on hold by the user depressing the hold key. In well known manner under A lead control this action disconnects the A lead from ground resulting, after a momentary delay of up to about 50 milliseconds, in the disconnection of the station from the tip and ring conductors so that it can be used to answer or make another call on another line. In response to this sequence the hold arrangement of the line circuit functions to connect a hold bridge across the tip and ring conductors of the held line to simulate a condition of the station remaining on the line. Thus, the communication path is maintained in an active state with d.c. loop current flowing, albeit in a noncommunicating mode. The line status, while in this mode, is signaled at the station by a visual indicating lamp operated by a lamp control circuit.

In conventional line circuit designs, such as those represented by the Barbato and Fitzsimons patents, the winding of a hold current detect or line relay is positioned and maintained in series in either the T or R conductor where it remains energized so long as d.c. line current is present—that is, throughout the line busy and line hold conditions. The presence of the relay coil in the conductor path introduces the series impedance condition responsible for excessive levels of imbalance in the longitudinal path of the type now limited by the F.C.C.'s prescribed technical balance limits. While Fitzsimon's design employs a capacitor in parallel across the series coil of the line relay to offset the degrading effects of this relay arrangement on the audio signals passed over the telephone line, such a technique imposes additional cost on the line card. It should be noted that, in the interest of at least minimizing the amount of undesired series impedance introduced by the positioning of the line relay coil in the tip or ring conductor in the foregoing manner, it has been necessary to employ relatively large relays with low impedance coils in the circuits of such prior art designs. This has limited the ability of line card designers to reduce the physical profile of the line card, thereby limiting the opportunity to introduce compactness into the overall key system design.

The prior art represented by the Angner patent comes closer to achieving a longitudinally balanced line circuit design than either Fitzsimons or Barbato. The hold circuit arrangement in Angner does not require that the hold current detect or line relay be positioned, at all times, in one or other of the telephone line conductor paths. In fact the line relay coil is by-passed by a shunt circuit during the normal line busy state. In contrast to Barbato and Fitzsimons, Anger places the coil of the hold current detect relay in series with the hold resistor which, together, are shunted across tip and ring of the telephone line as the hold bridge impedance during the line hold state. When operating in this state Angner purports to achieve a longitudinally balanced condition with respect to ground (i.e., zero "shunt" unbalance). However, by Angner's design the hold resistance continues to interpose a series resistance in the R conductor of the longitudinal path between the telephone line and the station during the hold mode thereby introducing an undesirable "series" unbalance. Further, the line relay of the Angner design requires that, in different operating states, at least one of two relay coils be serially connected in the tip or ring path during the hold, or transition to hold, modes. Again, as with the designs of Barbato and Fitzsimons, while Angner may have achieved improvement in the balance performance of the conventional line circuit it continues to require a relatively large line relay thereby perpetuating the bulky character of conventional line card technology.

Accordingly, it is an object of the present invention to provide a telephone hold circuit arrangement which maintains a condition of longitudinal balance on the telephone line during all normal steady state modes of operation.

It is another object of the present invention to contribute toward a highly reliable, more compact, and less costly telephone line circuit acceptable under the Federal Communication Commission's Part 68 Registration Standards and throughout the industry.

It is yet a further object of the present invention to provide a telephone hold indicator circuit which operates with and takes advantage of the simplified circuitry employed in achieving the above objects.

SUMMARY OF THE INVENTION

The desired line circuit design objective of maintaining a longitudinally balanced condition during normal operating states cannot be achieved so long as any amount of serial inductance or serial resistance exists in either the tip or ring conductor path between the central office line and the station. The instant invention overcomes this deficiency of prior art line circuits by means of a zero impedance hold circuit arrangement. An opto-coupler circuit is employed to detect the presence of d.c. line current at the initiation of and during the hold condition, and to maintain a hold relay in the energized state throughout the hold mode. Excitation of the hold relay operating circuitry is achieved by a momentary flow of d.c. current through the light emitting diode of the opto-coupler while connected in the serial path of the line-to-station tip conductor. However, this condition lasts only long enough to complete the energization of the hold relay circuitry and its duration is limited by the time it takes for an A lead relay to complete the transition from a normally energized to a de-energized state in response to removal of ground from the A lead by the initiation of a hold request. Once energization of the hold relay is completed the light emitting diode circuit of the opto-coupler is shunted across tip and ring in series with the hold resistance, whereby the continued presence of d.c. line current results in the generation of constant energizing signal by the LED. By the novel employment of the contact structure of two pole double throw miniture relays the impedance effects on the light emitting diode circuit are maintained electrically isolated from the longitudinal path of the telephone line at all times except during the momentary transition during the hold initiation state.

Acceptable limits of longitudinal balance is achieved by avoiding the use of any series inductance or series resistance devices during normal steady state conditions. By not energizing either the hold current detect or hold relay circuitry directly from d.c. line current, and by not requiring dual wound relays, a line circuit incorporating the subject invention can use smaller, less expensive relays resulting in a line card having a thinner, more compact profile at a lower overall cost.

Further, the hold arrangement operates with novel OR logic circuitry for controlling a visual line status indicator.

BRIEF DESCRIPTION OF THE DRAWING

Referring now to FIG. 1, the hold circuit defined by 100 is for use with 1A2-type key system technology. Not shown are essential line circuit elements, including but not limited to, a lamp interrupter circuit, ring detect circuit, power supply and music on hold—all well known, but omitted from this description for simplicity. However, it should be understood that the invention described herein is fully compatible and intended to be used or useable in conjunction with all such other familiar sub-circuits necessary to the construction of a completely functional key system line circuit.

Figures 1, 2:
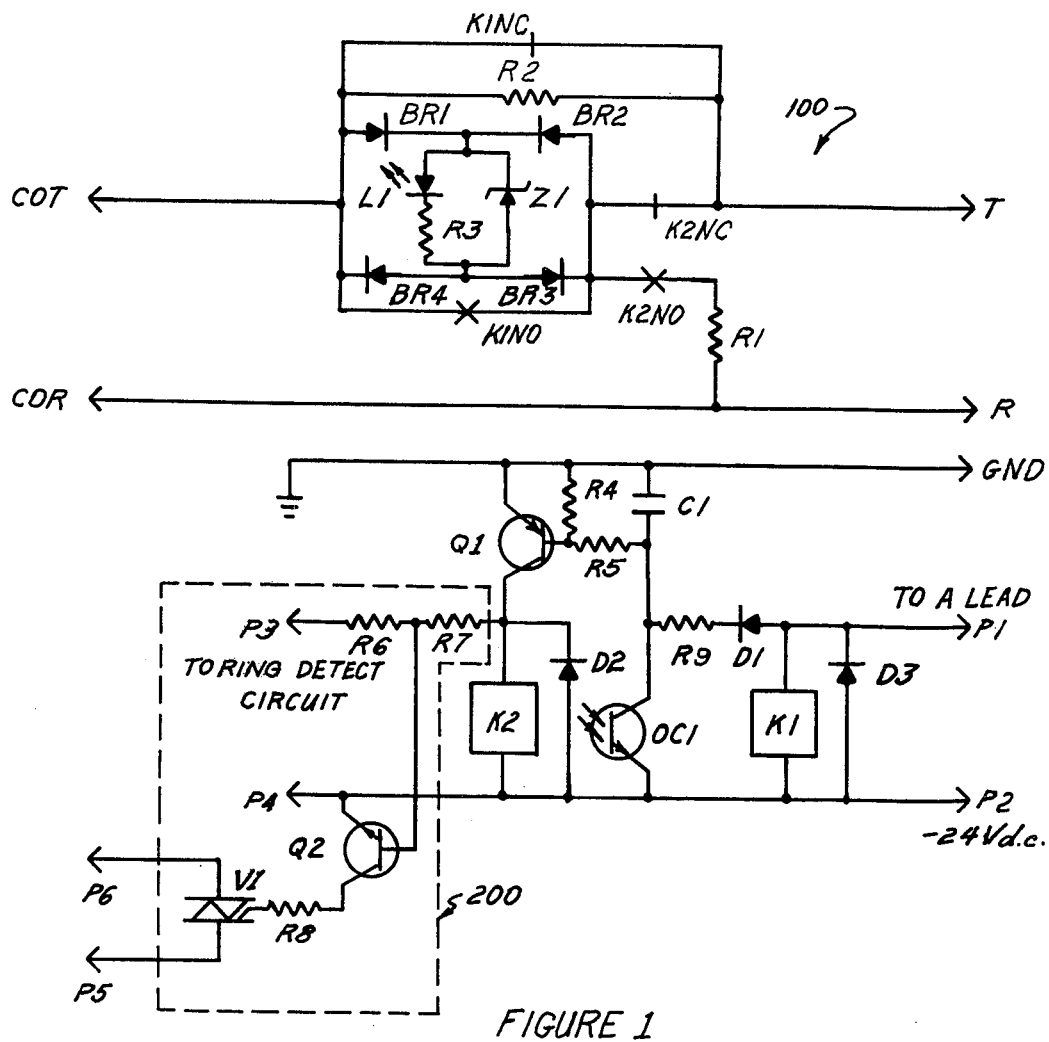
FIG. 1 is a schematic diagram of the hold circuit and lamp control arrangement of the present invention.
FIG. 2 is a table of typical resistance and capacitance values, which values should not be understood as in any way limiting the scope of the invention.

The hold circuit 100 constituting the present invention connects to central office (C.O.) tip and ring at COT and COR. One key of a conventional multibutton key telephone connects the station network and hand set via cabling to the telephone line, or "loop" at T and R.

The invention employs a light emitting diode circuit comprised of LED L1, zener Z1, resistors R3 and R2 and diodes BR1–BR4 connected in the series path of the tip conductor. Ordinarily this would introduce a series impedance in the tip path which, but for the features of the present invention described hereafter, would result in an unacceptable longitudinally imbalanced condition.

The LED circuit functions to detect the presence of low voltage d.c. current in the telephone line indicative of an active state and emits an energizing light pulse in response to a station initiated request to place the telephone line on hold. Component R3 provides transient supression, while the diode bridge formed by BR1 through BR4 serves as a polarity guard to protect LED L1 from polarity reversals initiated by the central office switch to signal call termination. Zener diode Z1 in parallel with L1 serves to limit current through L1 by clamping the voltage across the series combination of L1 and R3.

Longitudinal imbalance in the COT/T path is avoided because the series impedance of the LED circuit is electrically shunted during all normal operating states by relay contacts K1NC and K1NO, the normally-closed and normally-open contacts of relay K1. Relay K1 is a two-pole, double-throw miniature relay having a break-before-make contact structure. Relay K1 is de-energized in the line idle and line hold states, or, in other words, whenever the line circuit A lead is released from ground. In the de-energized state normally-closed contact K1NC completes a zero impedance shunt circuit bypassing the LED circuit in the COT/T conductor path, thereby maintaining a longitudinally balanced condition. When the A lead of the line circuit's A lead control is grounded in accordance wwith conventional practice relay K1 is energized. In the energized state closed contact K1NO completes an alternative zero impedance shunt circuit between the telephone line and the station. bypassing the LED circuit and thereby maintaining the desired longitudinal balance in the COT/T and COR/R line to station path while the line is in the normally busy state.

Resistor R1 is a resistive element in a hold bridge which is shunted across COT and COR by the operation of hold relay K2 and contacts K2NO and K2NC. Hold relay K2 is also of two-pole, double-throw miniature relay having a break-before-make contact structure.

Hold relay K2 is energized by the switching transistor circuit comprised of transistors OC1 and Q2 and capacitor C1. Transistor OC1 is a photo transistor and is optically coupled to receive energizing light signals from LED L1. The collector of photo transistor OC1 is connected to the junction of capacitor C1 and the base of switching transistor Q2 via the voltage divider circuit formed by resistors R4 and R5. The single coil of relay K2 is connected to the collector of transistor Q1 and K2 thereby energized when Q1 is switched "on". Diodes D2 and D3 clamp the induced voltage when the respective K1 or K2 relay is de-energized. D1 and R9, together, serve to disable the hold switching circuit when the A lead is grounded.

As a further embodiment of this invention logic circuitry 200 has been employed to operate in conjunction with the K2 relay circuit to operate the line circuit lamp control. The circuit is comprised of Triac V1, transistor Q2 and the OR gate represented by the junction of resistors R6 and R7 connected to the base of transistor Q2. One input of the OR gate represented by resistor R7 is connected to a source of voltage indicative of the operating state of the hold relay circuit, such as the collector of switching transistor Q2. The other input to the OR gate is similarly connected through resistor R6 to a source of voltage indicative of the operating state of the line circuit's ring detect sub-circuit, such as the collector of another transistor. When a voltage source at either input appears at the base of Q2, Q2 switches on, causing current to flow through the gate of V1 by way of resistor R8. V1 in response provides an ac circuit path between pins P5 and P6. Pins P5 and P6 are normally connected to elements well known in the field to control an external device for generating lamp signals.

CIRCUIT RESPONSE TO HOLD REQUEST

In a normal line busy state low voltage telephone line current flows in the series path from COT to the station network connected at T. While in the line busy state the A lead control is grounded and A lead relay, K1, is steadily energized. In the K1 energized state normally-open contacts K1NO are closed, and normally-closed contacts K1NC are open. Hold relay K2 is not energized in the line busy state, and thus contacts K2NC and K2NO remain in their normally closed and open positions, respectively.

Although the LED circuit of this invention is normally serially connected to the COT/T path, the potential imbalance effect of the series impedance which would otherwise be introduced is totally avoided by the bypass circuit formed by the closure of A lead relay contact K1NO and the normally-closed position of contact K2NC of de-energized hold relay K2. The shunt path established by the simultaneously closed positions of contacts K1NO and K2NC effectively electrically isolates the inherent characteristic impedance of the LED circuit from the COT/T conductor, thereby preserving a balanced condition with respect to the COR/R conductor.

In the line hold state A lead relay K1 is deenergized by the removal of ground from the A lead. This restores contacts K1NC and K1NO to their normally-closed and open positions, respectively. While the opening of contact K1NO breaks one shunt connection around the LED circuit, the closure of contact K1NC, however, re-establishes another series connection shunting the LED from the path COT/T, thereby maintaining a longitudinally balanced condition with respect to the path COR/R throughout the hold condition.

In order to switch from the line busy to the line hold state the hold circuit arrangement of this invention must pass through a momentary transition state of a few milliseconds duration. This transition period, however, is not regarded in the industry as a "normal steady state condition", and any possible momentary condition of longitudinal imbalance which might occur during the transition from the busy to the hold state would be too brief to be disruptively perceived on the public telephone network.

The length of the transition period typically encountered in conventional hold circuits may run as high as 50 milliseconds. In the instant invention the period amounts to approximately 8 milliseconds, and is determined by the time it takes for the K1 relay to deenergize in response to the removal of ground from the A lead, and for the contacts K1NC and K1NO to be restored to their normal positions. However, the time that the contacts are actually in motion between the transition is about 0.8 ms. It is during this period of K1 contact transition that the LED circuit of the instant invention operates to energize the switching transistor circuitry of hold relay K2 and thereby complete the establishment of the line circuit hold function.

At the moment following the removal of ground from the A lead and the start of deenergization of relay K1 the series bypass circuits formed by contact K1NO during the line busy state and K1NC in the not yet established hold state are broken until a steady state condition is reestablished. During this period the LED circuiit of the instant invention is maintained in the serial conductive path between COT and T. If d.c. line current is present (indicating that the line is still active) the LED circuit will detect line current flow, the LED L1 will immediately emit a light pulse. The photo transistor portion of the opto-coupler comprised of L1 and OC1 responds by turning on and thereby energizing switching transistor Q1.

The light pulse from LED L1 is not of sufficient duration to cause relay K1 to operate. Therefore, capacitor C1 is employed to accumulate a charge in order to maintain a forward bias on the base of Q1 to keep Q1 turned on for enough time to permit the operation of K2.

As Q1 is turned on, the coil of hold relay K2 is energized and K2 operates to switch the hold resistor R1 into a shunt path with conductors COT and COR. This shunt connection is established by the closure of normally open contact, K2NO. Contact K2NO is connected in series with the LED circuit so as to place it in the hold bridge with resistor R1. Thus, when the bridge connection is completed line current, if present, continues to flow through the LED circuit and LED L1 emits a continuous light signal. The light signal keeps CO1 turned on which, in turn, keeps the switching transitor Q2 on and holds relay K2 energized.

As long as the hold condition is maintained, contact K1NC of deenergized A-lead relay K1 remains closed thereby maintaining zero serial impedance in the path COT/T and a balanced condition with respect to the path COR/R. Restoration of ground to the A-lead bleeds the energizing current from OC1 through R9 and diode D3, which turns Q1 off after a short delay, deenergizing K2. Relay K1, on the other hand, is energized by the return of ground to the A lead, causing contacts K1NO and K1NC to close and open respectively, reestablishing the shunt path around the LED circuit which has been returned to the series path COT/T by the closure of contact K2NC. When the hold condition is terminated at the destination end the reverse polarity signal sent from the central office interrupts the d.c. current flow through LED L1 and thereby terminating the energizing light signal to OC1, causing Q1 to turn off and thereby deenergize K2. With K2 deenergized contact K2NC and K2NO return to their normal position, with K2NC completing the restoration of the LED circuit into the serial path between COT and T.

What is claimed is:

1. A hold circuit arrangement for a telephone line circuit for controlling the hold function between a two conductor PBX or central office telephone line and at least one telephone station without introducing an undesireable series impedance condition in the longtudinal path of the telephone line during any of the line circuit's normal operating states, said line circuit adapted for ring detection, lamp control and for A lead control between said station and said line circuit, said hold circuit arrangement comprising:

means for generating an energizing signal in response to the presence of d.c. current in said telephone line, first and second circuit means for establishing an electrical shunt by passing said energizing signal means in the longitudinal path of said telephone line during all normal operating states of the line circuit, said first circuit means operating to establish said electrical shunt during the line busy state and said second circuit means operating to establish said electrical shunt during the line hold state, means operated by said A lead control in response to a station initiated request to place said telephone line in a hold condition for momentarily switching said energizing signal means in an electrical series connection in the longitudinal path of said telephone line during the transition from the line busy to the line hold condition, whereby said energizing signal is generated if d.c. current is present in said telephone line, hold means for establishing a hold bridge connection across said telephone line throughout the hold condition, said hold means operated in response to said energizing signal, said hold means including means for shunting said energizing signal means across the longtudinal path of said telephone line in a series path with the hold bridge upon establishment of the requested hold condition whereby said energizing signal will continue to be generated so long as d.c. current continues to be present in said telephone line, and means for signaling the release of the hold bridge connection in response to the termination of the hold condition.

2. The invention set forth in claim 1 wherein said energizing signal means is a light emitting diode circuit, said circuit operating to produce a light signal in response to the presence of d.c. current on said telephone line.

3. The invention set forth in claim 2 wherein said hold means includes a hold relay operated by an energizing circuit including a switching transistor and photo transistor optically coupled to said light emitting diode circuit and electrically connected to the base of said switching transistor, said photo transistor operating in response to said light signal to turn on said switching transistor and thereby electrically energize said hold relay.

4. The invention set forth in claim 3 wherein the switching transistor in said energizing circuit is maintained in a conductive state by a charged capacitor connected to the base of said switching transistor and to the collector of said photo transistor, the charge on said capacitor being established and maintained so long as said photo transistor continues to receive said light signal.

5. The invention set forth in claim 4 wherein the means operated by said A lead control includes a two pole double throw A lead relay having a break-before-make contact structure, the normally open contacts of which are employed in said first circuit means to form a zero impedance shunt connection bypassing said light emitting diode circuit when said A lead relay is energized and the normally closed contacts of which are employed by said second circuit means to maintain a zero impedance series connection in the longitudinal path between said telephone line and said station when said A lead relay is de-energized thereby avaoiding any undesired series impedance condition on the telephone line except during the momentary period in which said relay is transiting from the energized to the de-energized state.

6. The invention set forth in claim 5 wherein said A lead relay is maintained in an energized state when ground appears on the A lead control, and said A lead relay is de-energized when said A lead control is released from ground in response to a station initiated request to place the telephone line in a hold condition.

7. The invention set forth in claim 6 wherein the release of the hold bridge connection is signaled by the absence of the light signal when the hold condition is terminated by the cessation of d.c. current on the telephone line, and by the re-apearance of ground on the A lead control when the hold condition is terminated by a station initiated command.

8. The invention claimed in claim 7 further comprising means for operating said lamp control in a manner indicative of line hold and line ringing conditions, said means comprises a triac controlled by an OR gate,
a first input of which is connected to the collector of said energizing circuit switching transistor whereby said lamp control is operated at a first rate indicative of the operating state of the hold relay, and
a second input of which is connected to a signal source in the ring detect circuit whereby said lamp is operated at a second rate indicative of the presence of a ringing signal on said telephone line.

* * * * *